US006381523B2

(12) United States Patent
Sone

(10) Patent No.: US 6,381,523 B2
(45) Date of Patent: Apr. 30, 2002

(54) TRAVELLING VEHICLE SYSTEM

(75) Inventor: Hiroki Sone, Kagamigahara (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/863,526

(22) Filed: May 24, 2001

(30) Foreign Application Priority Data

May 26, 2000 (JP) ....................................... 2000-156247

(51) Int. Cl.[7] ................................................ G05D 1/00
(52) U.S. Cl. ............................................ 701/23; 701/2
(58) Field of Search ................................ 701/23, 24, 2, 701/300; 180/167, 168, 169; 342/455, 456, 451

(56) References Cited

U.S. PATENT DOCUMENTS 4,918,607 A * 4/1990 Wible ......................... 180/169
5,781,437 A * 7/1998 Wiemer et al. ............... 701/23
6,163,745 A * 12/2000 Purchase et al. .............. 701/23
6,167,331 A * 12/2000 Matsumoto et al. .......... 701/23
6,253,128 B1 * 6/2001 Kagenama et al. ........... 701/23
6,321,147 B1 * 11/2001 Takeda et al. ................ 701/23

FOREIGN PATENT DOCUMENTS

JP 9-74616 3/1997

* cited by examiner

*Primary Examiner*—Richard M. Camby
(74) *Attorney, Agent, or Firm*—Armstrong, Westerman & Hattori, LLP

(57) ABSTRACT

A distribution computer 10 and a plurality of controllers 12~15 are connected together via a LAN. One of the controllers acts as a main controller 12 to transmit control from the distribution controller 10 to the controllers 12~15. The controllers 12~15 are duplicated so as to back up one another, and a main programmable controller 16 monitors the controllers 12 to 15 to detect defects. Arc nets 19~22 are connected together via an RS232C line to communicate the passage of a travelling vehicle between themselves. Even with an extended running path, the present invention hinders a delay in communication and thus a delay in control, thereby preventing system down caused by a defect in a controller.

4 Claims, 5 Drawing Sheets

TRAVELLING VEHICLE SYSTEM

FIELD OF THE INVENTION

The present invention relates to a travelling vehicle system, and in particular, to prevention of a delay in control and system down which may occur when the overall length of a traveling path for travelling vehicles is increased to obtain a larger-scale system.

BACKGROUND OF THE INVENTION

In a travelling vehicle system such as a tracking cart system, a running path is divided into a plurality of zones and a zone controller is provided for each zone so as to control a travelling vehicle that has entered that zone. A system controller is also provided for controlling these zone controllers, and a network is used to connect all of these controllers together. The system controller receives a conveyance instruction from an upper controller such as a distribution computer for the entire factory to correspondingly control the zone controllers, and report the results of conveyance to the distribution computer.

When the scale of the travelling vehicle system is increased and the running path for travelling vehicles is extended, a larger number of zone controllers are required and a delay may occur in the communication between the system controller and the zone controllers, thereby wastefully stopping travelling vehicles. Additionally, as the number of zone controller is increased, the limit of the capacity of the system controller is reached soon. When additional system controllers are then installed and assigned with different running paths obtained by dividing the original running path, if any of the system controllers becomes defective, the travelling vehicle system is shut down.

It is a basic object of the present invention to prevent, despite an extended running path, a delay in the communication between zone controllers and a system controller as well as the system-down of a travelling vehicle system.

It is an additional object of the present invention to enable the communication between adjacent group zone controllers without using any system controller in order to prevent a delay in control.

It is an additional object of the present invention to reduce communication burdens on an upper controller such as a distribution computer.

SUMMARY OF THE INVENTION

The present invention provides a travelling vehicle system comprising a running path for travelling vehicles which is divided into a plurality of zones and a plurality of zone controllers for controlling the travelling vehicles in the corresponding zones, the system being characterized in that the plurality of zone controllers are divided into a plurality of groups, a plurality of group controllers are provided for controlling the corresponding groups, and each of the group controllers backs up at least one of the other group controllers.

Preferably, communication lines are provided to connect the groups together without using the group controllers.

Preferably, one of the group controllers acts as a main controller so that an upper controller and the plurality of group controllers communicate with one another via the main controller, and at least one of the other group controllers is configured to back up the main controller.

According to the present invention, even if the running path for travelling vehicles is extended and the number of zone controllers is increased, since the zone controllers are divided into the plurality of groups, which are assigned to the different group controllers, the amount of time required for the communication between the zone controllers and the group controllers can be reduced to prevent a delay in control caused by a delay in communication.

Furthermore, in the present invention, the plurality of group controllers back up one another, so that the system-down of the travelling vehicle system can be prevented even if any of the group controllers is shut down. Thus, in a factory, if a travelling vehicle system is used for a basic conveyance system or the like which is used for inter-process conveyance, a larger-scale reliable travelling vehicle system is obtained.

Furthermore, the communication lines are provided to connect the groups together without using the group controllers. This communication lines are auxiliary and different from lines for connecting the zone controllers and the group controllers together. Thus, the entry of a travelling vehicle into the adjacent group or the like can be processed through the communication between the zone controllers without using the group controllers, thereby preventing a decrease in the speed of the communication between the zone controllers which may occur at the boundary between the groups.

Moreover, one of the group controllers acts as the main controller to allow the group controllers and the upper controller to communicate with one another. Thus, the upper controller needs to communicate only with the main controller as in the prior art. Additionally, since one of the group controllers backs up the main controller, the travelling vehicle system is not shut down even if the main controller is shut down.

DETAILED DESCRIPTION OF THE PREFERRED EMBODIMENTS

Figure 1:
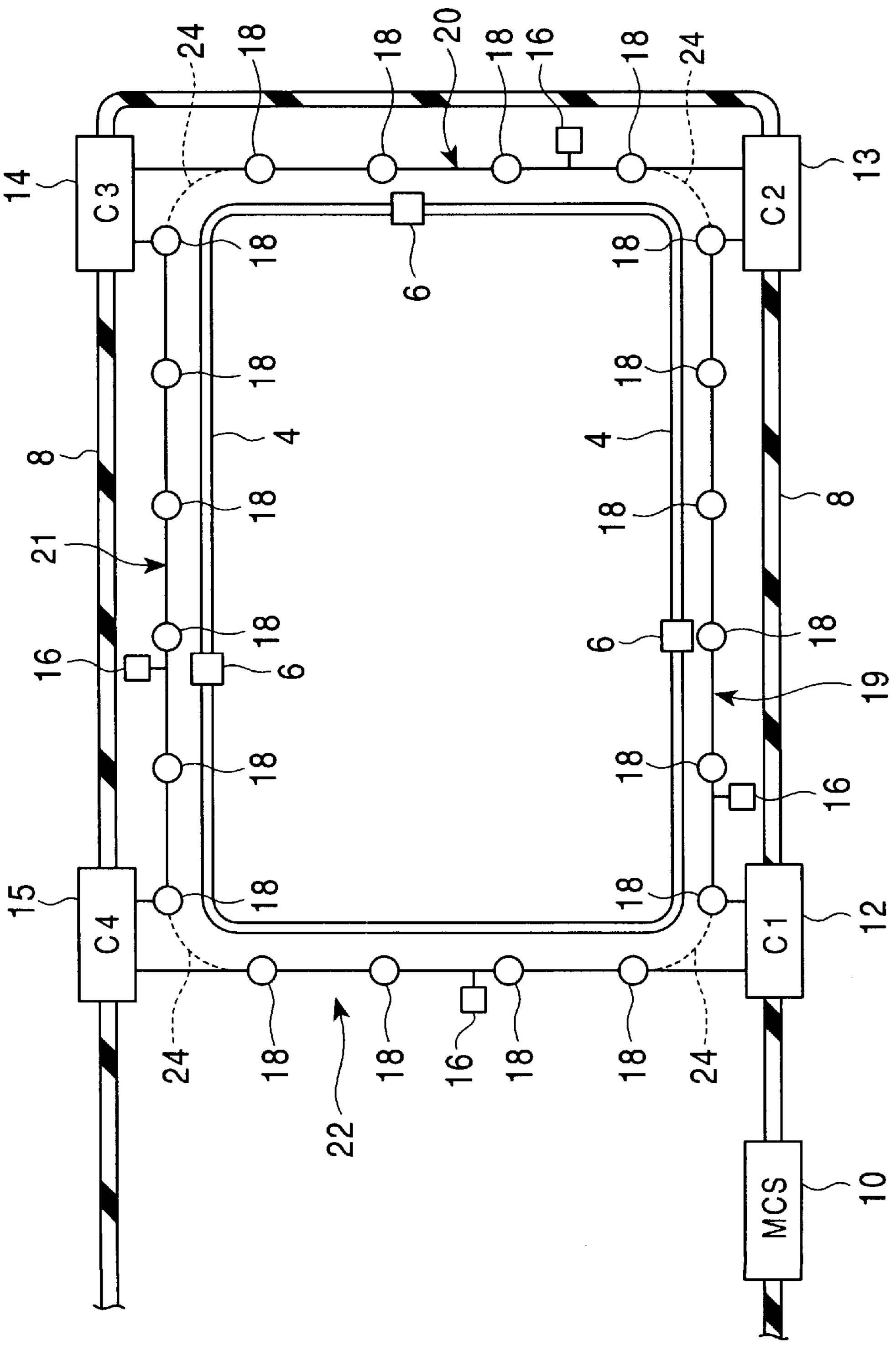
FIG. 1 is a layout of a travelling vehicle system of an embodiment of the present invention.
Figure 2:
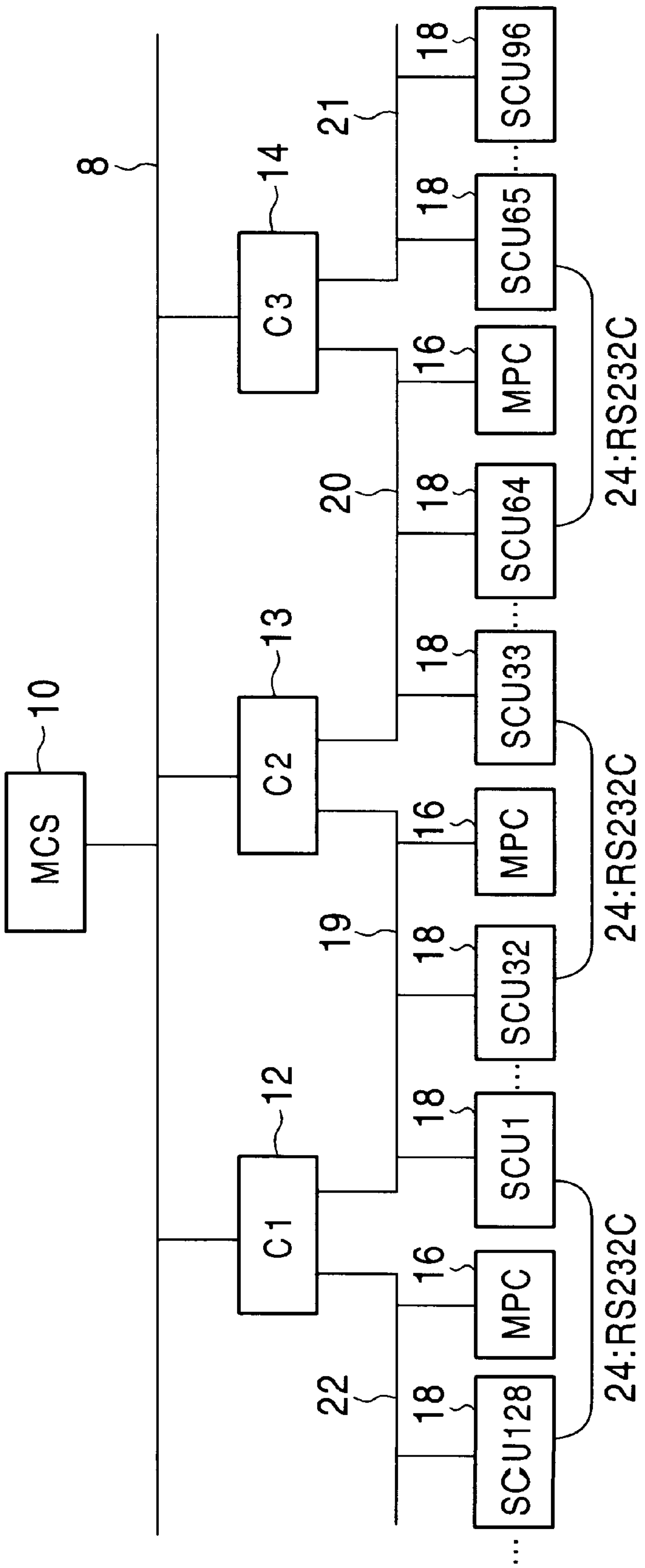
FIG. 2 is a view showing the configuration of a control system in the embodiment.
Figure 3:
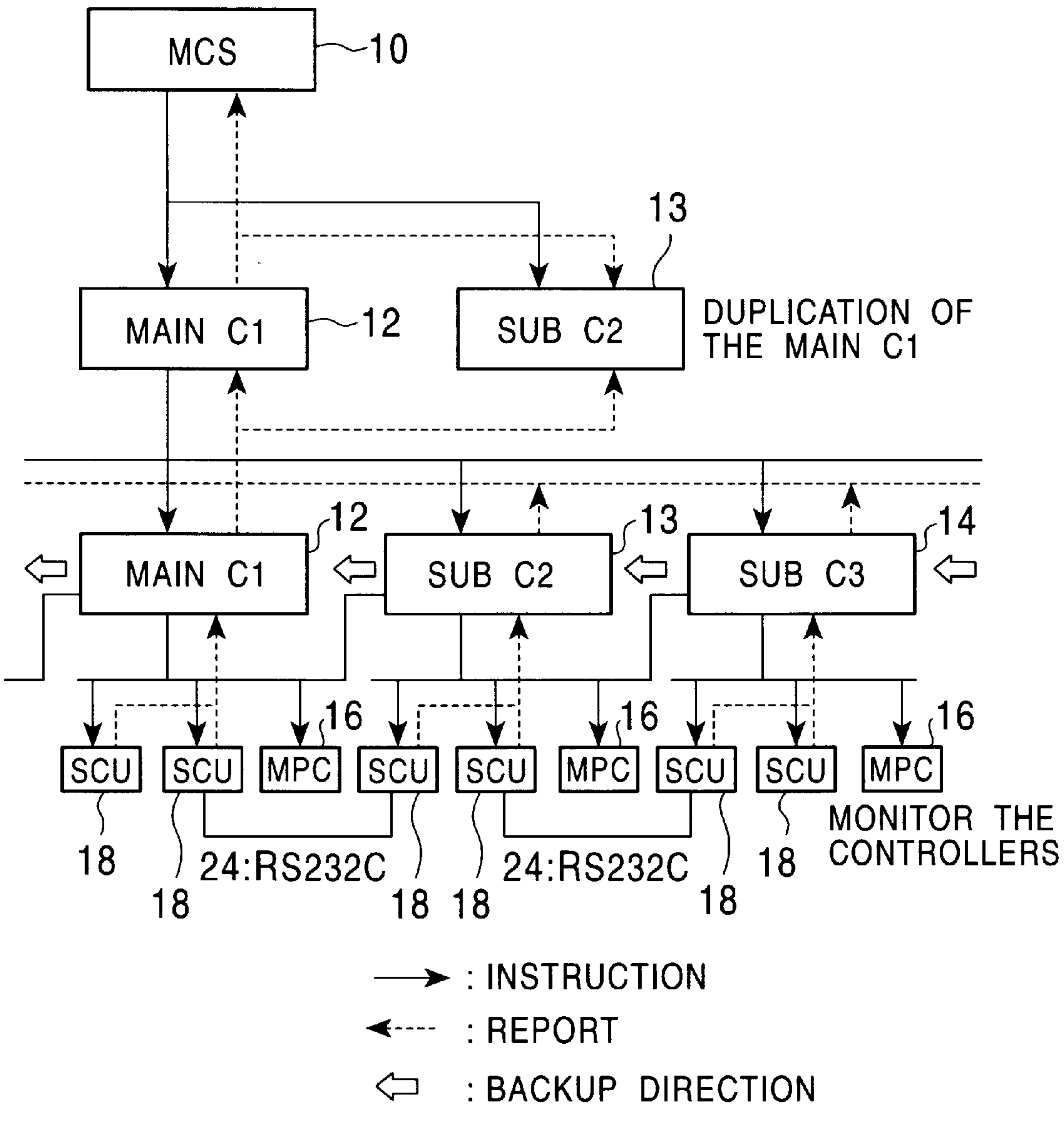
FIG. 3 is a view showing the relationship between the components of the control system in the embodiment.

FIGS. 1 to 3 shows an embodiment of the present invention. In these figures, 2 is a travelling vehicle system as a whole, 4 is a track, and 6 is a linear travelling vehicle. A linear motor (a primary conductor) may be provided on the ground (track) or on the travelling vehicle body. Instead of the linear travelling vehicle 6, another tracking cart or a travelling vehicle that runs without using any track may be used.

8 is a LAN, and 10 is a distribution computer for controlling the entire distribution of products in a semiconductor factory, a liquid-crystal factory, or the like, and the distribution computer 10 corresponds to an upper controller for the travelling vehicle system 2. 12 is a main controller, and 13~15 are subcontrollers. The controllers 12~15 actually have the same configuration. The controllers 12~15 are an example of plural group controllers, and the main controller 12 communicates with the distribution computer 10, and the subcontroller 13 backs up the main controller 12.

The subcontroller 14 backs up the subcontroller 13, the subcontroller 15 backs up the subcontroller 14, and the main controller 12 backs up the subcontroller 15. In this manner, the controllers 12~15 each back up the adjacent controller.

The controllers 12~15 each control a plurality of zone controllers 18 via arc nets 19~22 constituting an information network. At the boundaries between the arc nets 19~22, the zone controllers 18, 18 are normally connected together via RS232C lines 24. The RS232C lines 24 are used to allow one of the zone controllers 18, 18 to directly notify the other that the linear travelling vehicle 6 has entered the area of the adjacent arc net. The controllers 12~15 are each connected to the two arc nets and normally control only one of the groups of zone controllers 18, while controlling both groups of zone controllers 18 during backup.

The distribution computer 10 and the controllers 12~15 are connected together through the LAN 8 (information communication network) such as Ethernet, which operates at a high speed and has a large capacity. The main controller 12 communicates with the distribution computer 10, and this communication is intercepted by the subcontroller 13 for backup. The controllers 12~15 are each connected to the two arc nets and are each configured so as to control both the right and left arc nets (groups), and the arc nets are connected together via the RS232C line 24 at their boundary. Main programmable controllers 16 are each connected to a corresponding one of the arc nets 19~22 to check the communication from the controllers 12~15 or the like to the arc nets 19~22 in order to always monitor the controllers 12 to 15.

FIG. 3 shows how a signal is transmitted from the distribution computer 10 to the zone controller 18. The main controller 12 intervenes in the communication between the controllers 13~15 and the distribution computer 10. The distribution computer 10 transmits a conveyance instruction to the main controller 12 and receives the results of conveyance from the main controller 12. The backup subcontroller 13 intercepts the communication between the distribution computer 10 and the main controller 12, and the communication between the main controller 12 and the subcontrollers 13~15 and the like. The subcontroller 13 thus has management data for the conveyance system similar to those held by the main controller 12, so as to back up the main controller 12. In this embodiment, only one subcontroller 13 is assigned to the backup of the main controller 12, but all the subcontrollers 13~15 may back up the main controller 12.

In FIG. 3, the controllers 12, 13 are each shown separately in a block for controlling the entire conveyance system and in a block for controlling the zone controller 18, but these are the separate blocks in the same controller. The main programmable controller 16 always monitors the state of each of the controllers 12~15, and if any of the controllers 12~15 becomes defective, the main programmable controller 16 instructs the adjacent controller to perform a backup operation. Thus, whichever controller becomes defective, another controller may back up this defective controller to prevent system-down. The above adjacent controller intercepts the communication between the controller to back up and the distribution computer 10 via the LAN 8, and also intercepts the communication between the controller to back up and the zone controllers or the like via the arc net. Thus, when the main programmable controller 16 instructs backup, the adjacent controller can immediately control the arc net.

Further, since each controller controls only a limited number of zone controllers, almost no delay occurs in the communication between the controller and the zone controller.

Furthermore, the zone controllers 18, 18 can directly communicate with each other at the boundary between the arc nets 19~22 via the RS232C line 24, thereby preventing a delay in communication caused by the intervention of the controllers 12~15.

Figure 4:
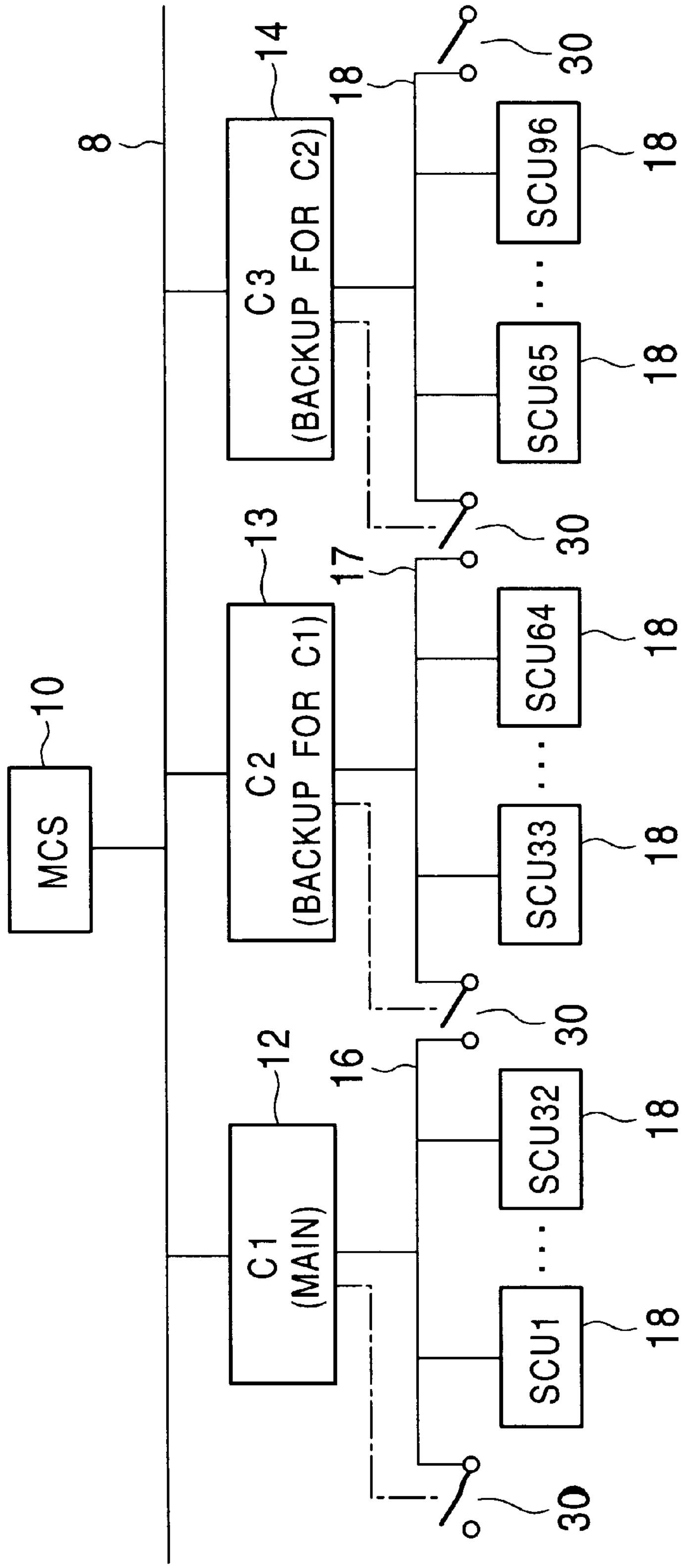
FIG. 4 is a view showing the configuration of a control system in a variation of the present invention.
Figure 5:
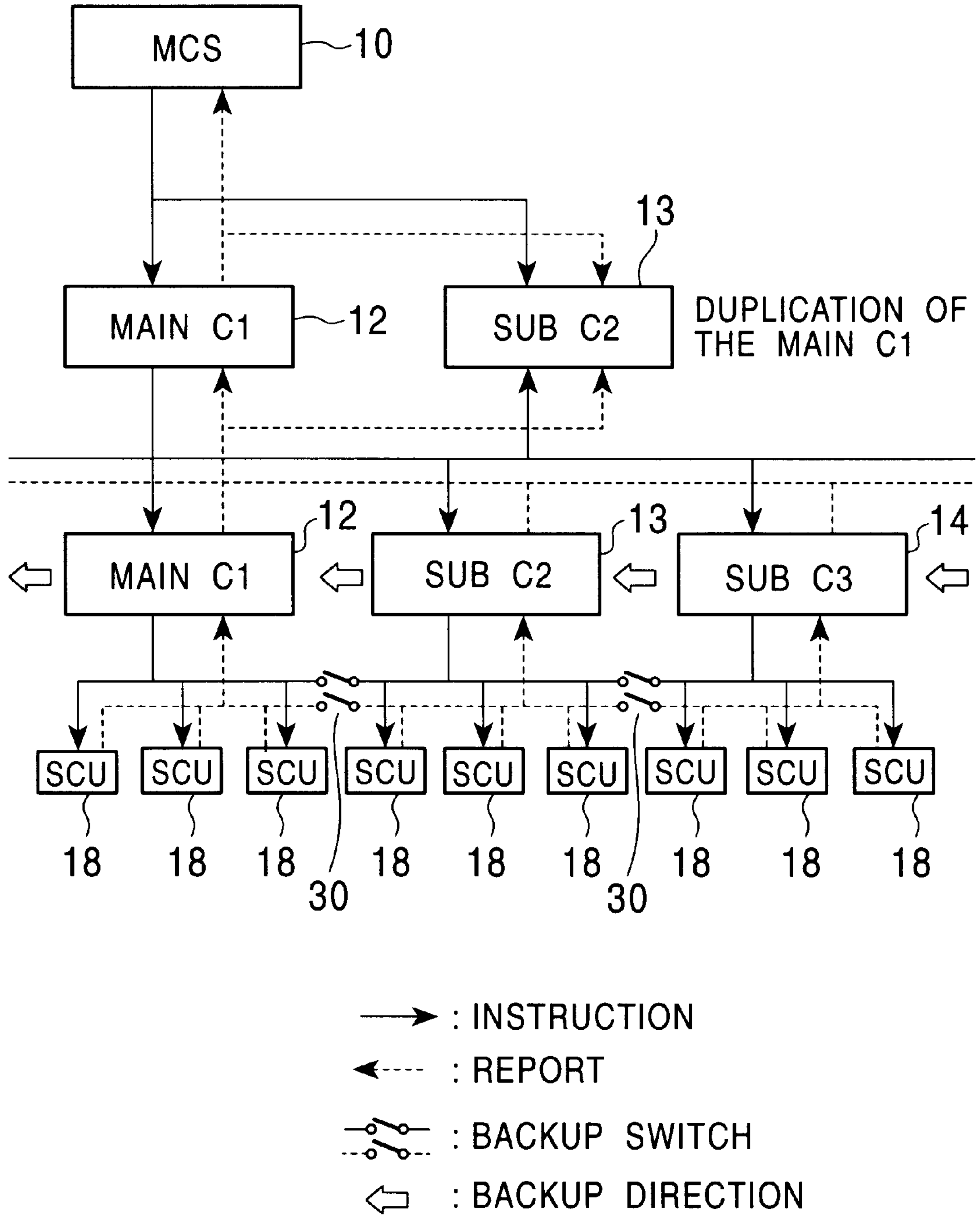
FIG. 5 is a view showing the relationship between the components of the control system in the embodiment.

FIGS. 4 and 5 show a variation of the present invention.

In this variation, the same reference numerals as those in FIGS. 1~3 denote the same components, that is, this variation is similar to the embodiment in FIGS. 1~3 except for the points indicated below. In the variation, a backup switch 30 is used to connect the adjacent arc nets 19~22 together for backup, and if any of the controllers is shut down, the backup switch 30 is closed to connect the adjacent arc nets together for backup. Then, the main controller 12 is backed up, for example, by the subcontroller 13 for duplication and each controller is similarly backed up by the adjacent controller for duplication. If any of the controllers becomes defective, the backup switch 30 is closed to allow one corresponding controller to control the two groups for backup.

What is claimed is:

1. A travelling vehicle system comprising a running path for travelling vehicles which is divided into a plurality of zones and a plurality of zone controllers for controlling the travelling vehicles in the corresponding zones, the system being characterized in that:

said plurality of zone controllers are divided into a plurality of groups, a plurality of group controllers are provided for controlling the corresponding groups, and each of the group controllers backs up at least one of the other group controllers.

2. A travelling vehicle system according to claim 1, characterized in that communication lines are provided to connect said groups together without using the group controllers.

3. A travelling vehicle system according to claim 1, characterized in that one of said group controllers acts as a main controller so that an upper controller and said plurality of group controllers communicate with one another via the main controller, and at least one of the other group controllers is configured to back up the main controller.

4. A travelling vehicle system according to claim 2, characterized in that one of said group controllers acts as a main controller so that an upper controller and said plurality of group controllers communicate with one another via the main controller, and at least one of the other group controllers is configured to back up the main controller.

* * * * *